United States Patent

[11] 3,539,123

| [72] | Inventor | Donald P. Shutt<br>Long Beach, California |
|---|---|---|
| [21] | Appl. No. | 744,225 |
| [22] | Filed | July 11, 1968 |
| [45] | Patented | Nov. 10, 1970 |
| [73] | Assignee | Western Electric Corporation<br>Lynwood, California<br>a corporation of Washington |

[54] WINDING DRUM FOR CONTINUOUS LINEAR CONDUCTOR
5 Claims, 13 Drawing Figs.

[52] U.S. Cl. .................................................. 242/54
[51] Int. Cl. ...................................................... B65h 75/00
[50] Field of Search .............................................. 242/47,
47.08, 47.12, 47.5, 54, 85, 86, 86.1

[56] References Cited
UNITED STATES PATENTS

| 3,120,355 | 2/1964 | Bowman | 242/54X |
|---|---|---|---|
| 3,128,857 | 4/1964 | Walton | 242/54X |
| 3,169,719 | 2/1965 | Babacz | 242/54 |
| 3,222,002 | 12/1965 | Holberg | 242/54 |

FOREIGN PATENTS

| 1,345,038 | 10/1963 | France | 242/54 |
|---|---|---|---|

Primary Examiner—Stanley N. Gilreath
Assistant Examiner—Werner H. Schroeder
Attorney—Forrest J. Lilly ABSTRACT: A winding drum for a continuous linear conductor, of any of several types, such as electric, pneumatic, hydraulic, optic, etc., but for a specific example, for a submarine cable or the like containing electrical conductors. A facility is provided by which the drum end portion of the cable, or other conductor, extends off the core of the drum, and is handled by a system of stationary and rotatable drums so that it will not twist and its extremity is stationary. Thus, in the case of a submarine cable, for example, it can be electrically connected, without slip rings, to a stationary electronic detector.

Patented Nov. 10, 1970

INVENTOR.
DONALD P. SHUTT
BY Forrest J. Lilly
ATTORNEYS

INVENTOR.
DONALD P. SHUTT
BY Forrest J. Lilly
ATTORNEY 6
3,539,123

WINDING DRUM FOR CONTINUOUS LINEAR CONDUCTOR

FIELD OF THE INVENTION

This invention relates generally to winding drums for reeling in or paying out a conductor, such as a submarine or other cable containing one or more electrical conductors, without twisting or rotating its drum end extremity. The invention is equally applicable to conductors for light, sound, fluids, liquids or other energy or media. Such a winding drum or reel is sometimes known as a "through" reel.

BACKGROUND OF THE INVENTION

As one present illustrative example, I may take the case of a submarine cable, the winding drum for which may be mounted on a ship and be used for spooling a cable intended to tow a detector for a mine or submarine. Such detectors may involve transducers for converting sound waves to electrical voltage waves or currents, which are transmitted by the conductors up the cable to the winding drum, and thence to electrical instruments appropriate for interpreting the voltages or currents transmitted. Obviously, the drum end of the cable must be fixed relative to the drum core, and therefore turns with it. It is more or less obvious to conduct the electrical currents from this rotating end of the cable to the stationary instrumentation facility on the ship by means of one or more slip rings. This is known practice. A comparable prior art expedient in the case of a hose involves the use of a rotary coupling.

Slip rings, in the case of an electric cable, are not an entirely satisfactory expedient since they introduce noise into the communication line, obscuring faint but important signals.

The general purpose of the invention, therefore, is to provide a winding drum for a conductor, such, for example, as an electrical submarine cable, wherein the winding drum end of the cable is stationarily fixed, and can hence be coupled to shipboard instrumentation or other facilities without the necessity of slip rings, rotary couplings or the like.

SUMMARY OF THE INVENTION

For convenience of description, I refer hereinafter to the rotatable winding drum that pays out and winds in cable as the main drum, to a second rotatable winding drum provided by this invention as an auxiliary drum, and to a nonrotatable drum provided by this invention as a rotatably fixed drum, since the latter could be axially movable in a "level winding" assembly preferably used but omitted from this disclosure for simplicity. The end of the conductor payed out from a winding on the main drum is referred to as the free end thereof, and its opposite end as the drum end extremity. The conductor is wound on the main drum beginning just beyond a point on the conductor spaced a predetermined distance from the drum end extremity thereof. This point on the conductor is affixed to a rotating point on the rotating structure of the main drum. The portion of the conductor between this point and its drum end extremity may be an added length of conductor, equal in length to the aforementioned predetermined distance, and may be coupled to the main conductor at the point of affixation of the latter to the main drum structure. Broadly, however, it is best to think of the conductor as continuous from its drum end to its free end, and as fixed to the rotating structure of the main drum a predetermined distance from its drum end extremity. Beyond or outside this fixed point, the conductor is wound on the main drum. The drum end extremity of the conductor is fixed against rotation with the drum. To this fixed extremity is coupled the leadoff conductor, containing electric wires, or consisting of a hose, or otherwise, as the case may be.

The portion of the conductor between its nonrotatable or rotatably fixed extremity and its rotating point is accommodated by the invention so that it will not be twisted during paying out or reeling in. To accomplish this result, it is formed into a loop, with an intermediate bight, and the two portions or legs of the loop, on opposite sides of the bight, are wound into helical coils, one on a rotatably fixed storage drum, and one on an auxiliary rotatable drum or drum surface that turns with the main drum. The helical coil that starts from the point of stationary attachment of the conductor is wound on the rotatably fixed drum, and the helical coil that starts from the point of attachment of the conductor to a rotating point on the main drum structure is wound on the aforementioned auxiliary drum that turns with the main drum. The opposite ends of these helical coils join to form the bight of the loop. A pulley engages in this bight, and moves during winding drum rotation so as to keep the conductor loop taut at the bight between the coils.

The conductor forming the described loop is thus wound partially on the rotatable drum, and partially on the stationary or rotatably fixed drum, and assuming that the winding drum structure is driven in a direction to pay out submarine cable from the main or outside drum, the auxiliary rotatable drum winds on more conductor, and conductor is wound off the stationary drum. Arrangements according to the invention are so made that the cable can be unwound off the stationary drum and wound onto the rotatable drum at the same linear rate, with the cable loop bight and the pulley between the drums moving so as to accomplish this end.

Thus, one end of the conductor, e.g., electric cable, can turn with the main rotating drum structure, and the other remain stationary, and permanently coupled to stationary equipment, such as electronic instrumentation, while drum rotation transfers cable between the rotatable and rotatably fixed drums without causing any twist therein. Accordingly, electrical or other conduction takes place through the conductor system without rotation of the end of the conductor and, in the case of an electric cable, without use of slip rings.

DESCRIPTION OF THE DRAWINGS

The invention will be better understood from the following detailed description of an illustrative embodiment thereof, reference for this purpose being had to the accompanying drawings, in which.

DESCRIPTION OF AN ILLUSTRATIVE EMBODIMENT

In the drawings, the numeral 10 designates generally a suitable base, on the ends of which are erected standards 11 and 12 affording a mounting for a tubular drum shaft 13. This drum shaft 13 is nonrotatable, though not necessarily axially fixed, since in one form of the invention, not here shown, the drum shaft may oscillate axially in an organization affording level winding.

Figures 1, 2, 2A:
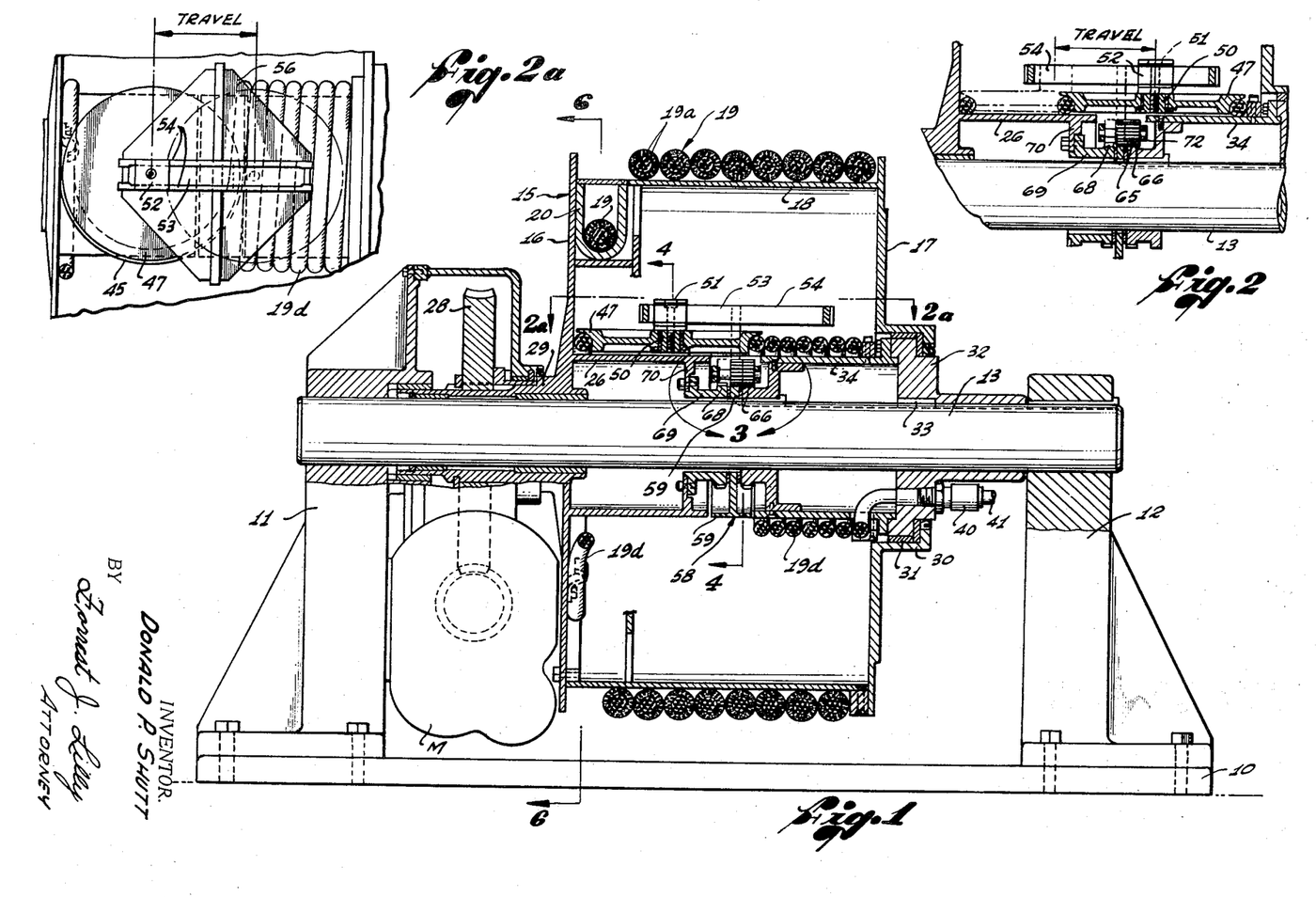
FIG. 1 is a side elevational view of one illustrative form of hoisting drum in accordance with the invention, parts being broken away on a vertical medial section.
FIG. 2 is a fragmentary view taken from FIG. 1, but showing the parts in an alternative position.
FIG. 2a is a section taken on the section line 2a of FIG. 1.
Figures 3, 4A:
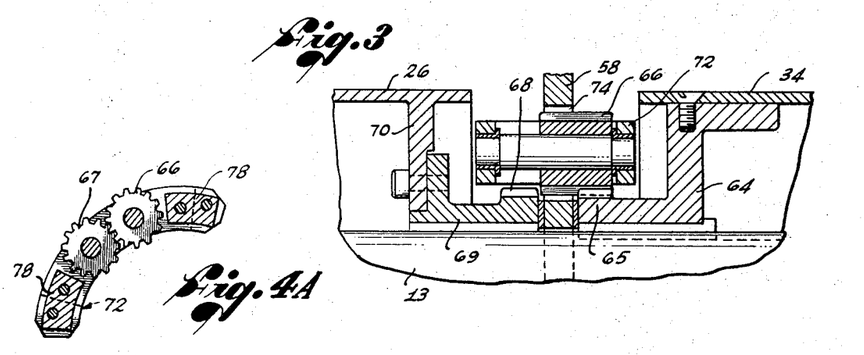
FIG. 3 is an enlarged view taken from FIG. 1, showing through an enlarged scale the parts contained within the circular arrow 3 of FIG. 1.
FIG. 4a is a detail section taken on line 4a–4a of FIG. 5.
Figure 6:
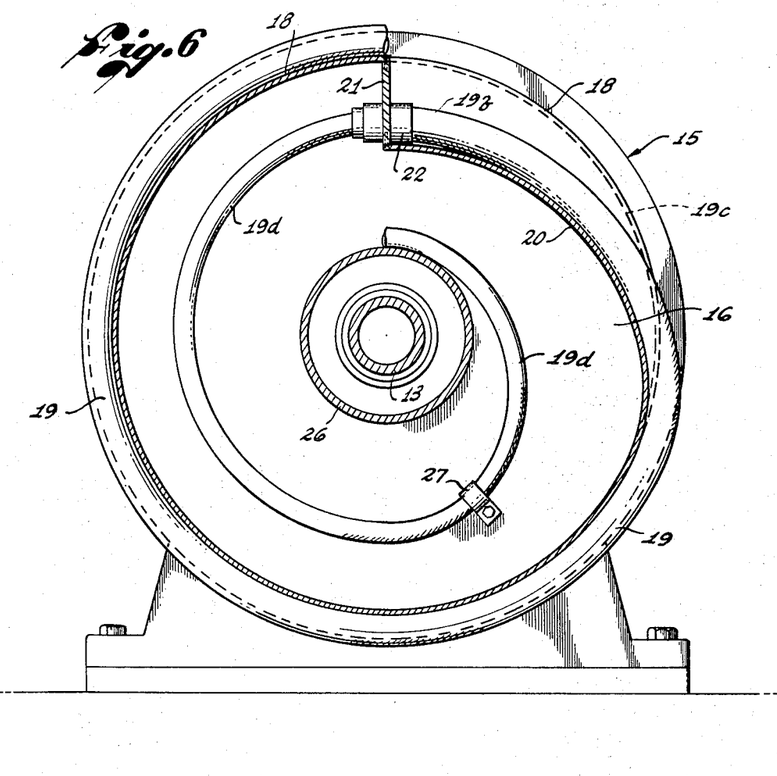
FIG. 6 is a section taken on line 6–6 of FIG. 1.

The main hoisting or winding drum is designated generally at 15, and embodies end flanges 16 and 17, and a winding drum cylinder 18 extending therebetween for winding what I term broadly herein and in the claims a conductor, or linear conductor 19. In this specific case, the "conductor" comprises a submarine cable embodying a plurality of interior electric wires or conductors such as designated at 19a. Around the cable is protective sheathing s. In an illustrative embodiment, the drum 18 may have a diameter of approximately 10 feet, and a cable storage capability of approximately 300 feet. In the illustrative example, the cable runs off the drum 19 at the right-hand end of the coil as seen in FIG. 1, and is wound clockwise on the drum, towards the observer, as viewed from the right-hand end of the drum in FIG. 1 (see FIG. 6). The cable 19, at the left-hand end of the drum 15, as seen in FIG. 1, is led inward, as indicated at 19b (see FIG. 6), through a suitable opening 19c in the drum cylinder 18, being guided by a U-shaped trough 20 cut into and welded to the drum. At the end of this trough 20 is a plate 21 extending inwardly from a fixed mounting on the drum, and fixedly supporting a cable holder and/or connector means 22 at which the submarine cable 19 has a stepdown to a smaller diameter, lighter, interior electrical cable portion 19d. The cable 19d may be regarded as a lighter extension of cable 19; or, in certain cases, the cable 19d may be simply a continuation of the cable 19 past the bracket plate 21 at which the cable is fixed to one end flange of the drum. According to a convenient and preferred practice of the invention, the lighter cable portion 19d is made from the cable 19 by merely stripping away the outside submarine shielding c. Alternatively, the holder means 22 can comprise an electric connector by which lighter cable 19d is plugged in to the end of the submarine cable 19. The cable portion 19d is shown in FIG. 6 to make one full turn on an inwardly spiraling path, and then to go on to a smaller interior auxiliary rotatable drum 26, with the same direction of wind as on the main drum, but progressing axially in the reverse direction, i.e., from left to right in FIG. 1. The cable portion 19d is shown as fastened to the drum flange 16 by a clip 27 at a point between the mounting bracket 22 and the drum 26. The point of fixation of the cable to the main drum may be at this clip, or at the holder or connection 22.

The drum 15 is driven by an electric motor M, and conventional reduction gears, including a worm wheel 28 journaled on shaft 13 and coupled to drum hub 29.

The aforementioned auxiliary or inside-rotating drum 26 is, in the illustrative embodiment, of a diameter roughly of the order of one-third that of the outside drum, and it is mounted on and projects from drum flange 16 coaxially with the drum axis for a distance a little short of half the width of the drum 18.

The opposite drum flange 17 is rotatably mounted, through a cylindric hub portion 30, and a bearing bushing 31, on a round mounting member 32 nonrotatably mounted on the shaft 13, as by key 33. Secured to this nonrotatable mounting member 32 and mounted thereon is a stationary, i.e., nonrotatable, or rotatably fixed, cylindric drum member 34, which is coaxial with the drum axis and projects inwardly into the drum 18 towards the end of the rotating drum 26. The effective length of the stationary drum cylinder 34 may be of substantially the same effective length as that of the rotating drum cylinder 26, and the two drums 26 and 34 are preferably of the same diameter, though not essentially so. As will be seen, there is a gap between the opposed ends of the drums 26 and 34.

One end of the cable portion 19d is fastened to the rotating winding drum structure as heretofore described, and the opposite end thereof, i.e., the drum extremity of the cable, extends through an opening in the flange end of the stationary drum cylinder 34, as indicated at 38, and thence is led through the stationary mounting member 32 to a coupling connection at 40 to a cable 41 leading to a shipboard electronic receiver installation, not shown. The cable portion 19d thus fastened at its two ends, one to the rotating drum structure adjacent the drum flange 16, and the other at the base or stationary mounting for the stationary drum 34, is formed with a long loop between these end mountings, and the loop is helically wound on the two drums 26 and 34, the cable lengths on opposite sides of the bight both going on respective drums in a counterclockwise direction as viewed from the right in FIG. 7, but with "opposite helix". In effected, the loop, designated at 44 in FIG. 7, forms a bight 45 which engages or goes around a pulley 47, which, in the illustrative embodiment, is in a plane substantially tangent to the cylinder defined by the drum members 26 and 34, the axis of the pulley being perpendicular to the main drum axis. Mounting and driving means for this pulley will be described hereinafter.

Figure 7:
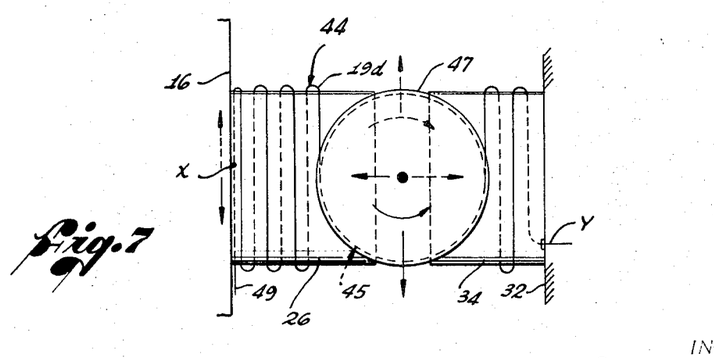
FIG. 7 is a diagrammatic elevational view illustrative of the winding of the conductor on certain stationary and rotatable drum members.

Directing attention to FIG. 7, the points of fixation of the two ends of the conductor cable 19d are designated at X for the connection to the reel flange 16 and at Y for the connection to the stationary drum 34 (or drum-mounting member 32). The end portion 49 of the cable 19d, outside or beyond the fixation point X, will be understood to be electrically coupled to the submarine cable 19 wound on the outside drum, as shown in FIG. 6. FIG. 7 illustrates that the two legs of the loop of cable 19d, whose ends are at X and Y, are helically wound on the drum members 26 and 34 in the same directions, but with opposite helix, and at certain times there will be more turns on the stationary drum member 34, as in FIG. 1, and at other times more turns on the rotating drum 26, as in FIG. 2. The arrangement may also be described by saying that the directions of wind of the two portions of the cable portion or length 19d are wound, taking the bight as the reference, on the drums 26 and 34 in the same directions away from the bight. Of course, as viewed along the drum axis, the cable portions on opposite sides of the bight wind on these drums in opposite directions, away from the viewer.

The pulley 47 is rotatable on a bearing support 50 (see FIG. 4), which carries a screw 51 supporting a slider 52 working in a way 53 between parallel rails 54. The latter are formed on a pulley carriage 56, which includes a flange 58, with a peripheral annular rim or cover 59, surrounding and journaled on the drum shaft 13. The flange 58 is in the preferred embodiment rotated about shaft 13, in the same direction of rotation as the rotating drums 18 and 26, and, in this embodiment, at one-half the speed of rotation of said drums, by gear means about to be described. The pulley 45 is thereby caused to planetate about the inside rotatable and stationary drums 26 and 34 at this half-speed rate, thereby winding the cable 19d off one end onto the other, depending upon the direction of drive of the outside drum 18. Thus, with one end of the cable fixed, and the other attached to the rotating drum, a length of cable 19d is wound onto rotating drum 26 from stationary drum 34 when the outside drum turns to pay out submarine cable, and vice versa, and the fixed end of the cable remains permanently and fixedly electrically connected to the shipboard instrumentation, without a rotary-sliding, noise-generating coupling. It is noteworthy that owing to the half-speed orbital travel of the pulley relative to the rate of rotation of the main drum 18 and auxiliary rotatable drum 26, the number of wraps of the cable portion 19d on the drums 26 and 34 is one-half the number of the cable 19 proper on the main drum 18.

In the end of the stationary drum 34 is a mounting ring 64, keyed on shaft 13, and affording a fixed spur gear 65, concentric with drum shaft 13, and somewhat smaller in diameter than drum 34. Meshing with fixed spur gear 65 is a small spur pinion 66, which meshes with a small spur pinion 67 of the same diameter, and the pinion 67 meshes with a spur gear 68, of the same diameter as gear 65, but does not mesh with gear 65 (FIGS. 1, 3, 4, and 5). The gear 68 is on the end of a gear sleeve 69, which is concentric with the drum axis, and which is secured to a flange 70 integrally formed with and projecting radially inward from rotating drum 26.

The pinions 66 and 67, which act as planet gears, the former rolling on stationary gear 65 and the latter meshing with rotating drum gear 68, are mounted within a slot 71 in a gear frame or truck 72, by means of rotatable axle and bearing means (FIGS. 3 and 5), and the pulley carriage flange 58 is slotted, as indicated generally at 74, to clear the spur pinions or planet gears 66 and 67. The slot 74 is elongated and narrowed at each end, as at 76, being defined by arcs struck from the drum axis, to accommodate and afford ways for arcuate slide plates 78 forming intermediate portions of the gear truck 72 at each end, so that the truck 72 has a limited capability of arcuate movement relative to pulley carriage flange 58, centered about the drum axis. The planet gear truck 72 holds the planet gears in mesh with the gears 64 and 68. To remove bight looseness, i.e., to keep tension in the auxiliary cable 19d, the planet gear truck 72 is held under tension relative to the pulley carriage 56 by tension springs 90 and an adjustable anchorage 92 to the carriage, as designated at 90.

The operation of the winding drum should now be clear, but a brief recapitulation will here be given. Assume, first, that the apparatus is in the position of FIG. 1, with the outside submarine cable 19 fully stored on the drum cylinder 18. The inside cable portion 19d will at this time be wound almost fully on the stationary inside drum 34, making only, for example, a partial turn on the rotating inside drum 26. Assume now that the submarine cable 19 is to be unwound from the main outside drum. Clearly, it will go off the right-hand end of the drum cylinder 18, away from the viewer, as seen in FIG. 1. Various cable-guiding or aligning means, not shown, may be used in connection with the drum cylinder 18. These, however, are not an essential part of the invention and will not be here represented. Accordingly, it is to be understood that the cable 19 leaves the drum cylinder 18 at the right-hand end of the latter, and pays out in a conventional manner, unwinding helically from the drum cylinder towards the left-hand end of the drum, as will be clear.

The drum rotates clockwise in thus paying out submarine cable 19, as viewed from the right-hand end in FIG. 1, or as seen in FIG. 6. As the submarine cable 19 is payed off the outside winding drum 18, the auxiliary or inside cable portion 19d then winds helically onto the rotating inside drum 26, as is occurring in FIG. 7. It will be seen that cable portion 19d is at this time being wound off the stationary drum 34. That is to say, equal lengths of cable in equal time intervals wind off the stationary drum 34 and onto the rotating drum 26. The pulley 47 is planetating, also clockwise, around the drums 26 and 34, at half the speed of rotation of the drum 26. It will be clear, under these conditions, that the rotation of drum 26 through a given angle, say 360°, results in progression of pulley 47 through an angle of 180°, and thus a length of cable equal to half the circumference of the drums is wound onto the rotating drum 26, and wound off the stationary drum 34.

As the cable is wound off the stationary drum 34 and onto the rotating drum 26, as from the position of FIG. 1 toward that of FIG. 2, it will be seen that the end of the cable loop, i.e., the bight 45, together with the pulley 47 engaged therein, will be moved by the cable in a direction longitudinally of the drums from the position of FIG. 1 towards the limiting position of FIG. 2. The pulley is accommodated in this motion by the aforementioned slide block arrangement seen in plan in FIG. 2a, where the pulley slider 52 can be seen to move longitudinally of the drums in the guideway 53 of the pulley carriage 56. Thus, as the submarine cable is payed out, the auxiliary cable portion 19d, the pulley 47, and the coils of cable on the stationary and winding drums 34 and 26, move progressively from the position of FIG. 1 towards that of FIG. 2. Clearly, during this performance, the end of the auxiliary cable portion secured to the stationary drum 34 and the fixed mounting member 38 remains stationary, and its interior conductors remain permanently connected to the instrumentation to which they are connected.

Figures 4, 4B:
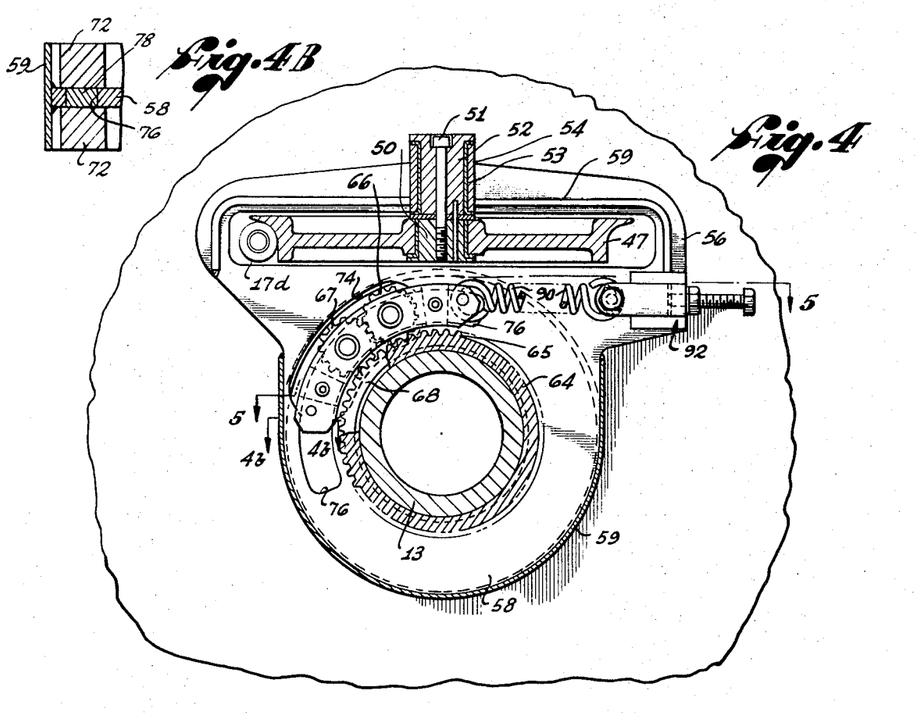
FIG. 4 is a section taken on the broken section line 4–4 of FIG. 1, and also on FIG. 5.
FIG. 4b is a detail section taken on line 4b–4b of FIG. 4.
Figure 5:
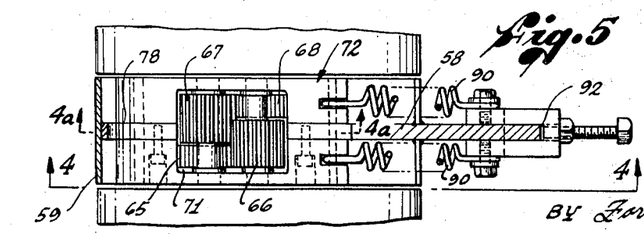
FIG. 5 is a section taken on the broken section line 5–5 of FIG. 4.

The operation of the illustrative drive by which the pulley carriage is rotated about the drum axis at half the speed of winding is as follows: Gear 68 rotates at winding drum speed. Gear 65 is stationary. When gear 68 rotates, the two planetary gears 67 and 66 are driven, gear 67 by the gear 68 rotating at drum speed, and gear 66, driven at the speed of planetary gear 67, simply rolling on stationary gear 64. In this condition, the meshing gears 66 and 67, mounted together in the gear frame or truck 72, rotate bodily about the drum axis, i.e., planetate, at a speed of rotation half that of the rotating drums. The direction of planetary rotation will be seen to be the same as the direction of drum rotation. Finally, the planetary motion is transmitted to the pulley carriage 56, and thence to the pulley 45, by the spring 90. It will be clear that this spring always acts to pull the pulley carriage in a counterclockwise direction, as seen in FIG. 4, and thus keeps the bight in the cable taut.

Of course, as the submarine cable is reeled in, the drums rotate in the reverse direction, and the auxiliary cable is wound in the reverse direction, from the rotating drum 26 onto the stationary drum 34.

It will be seen that I have provided a hoisting drum apparatus for an electrical submarine cable, having the feature that the drum end of the cable is stationary, and no rotary connections are required.

The invention is susceptible to many variations in physical organization, and a few of these will be mentioned. First, the rotating and stationary drums 26 and 34 have been described as of the same diameter, and it has been described that the gear means for driving the planetating pulley carriage then rotates or planetates, the latter at one-half the rate of drum rotation. Clearly, the drums 26 and 34 can be of different diameters, and compensation introduced by use of a correspondingly modified gear ratio in the gear drive for pulley carriage. Also, as will be clear to those skilled in the art, the gear drive for the carriage is subject to wide variation. For example, a simple bevel gear differential could be used. Again, the auxiliary rotating drum can be simply a portion of the main drum, and the stationary drum can be coaxial therewith and of the same diameter; and, clearly, also, the auxiliary drum could be the inside cylindrical surface of the main drum. Some of such variations, and others, will be described and illustrated.

Figure 8:
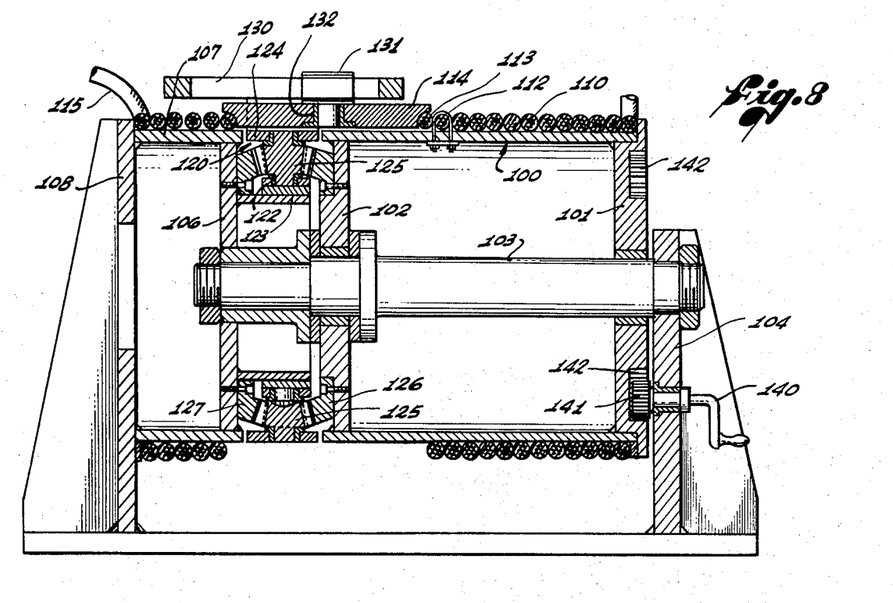
FIG. 8 is a longitudinal sectional view, somewhat diagrammatic, of an alternative embodiment of the invention.

In FIG. 8, the main rotatable winding drum and auxiliary rotatable drum comprise different longitudinal portions of a single drum. Thus, a cylindrical winding drum 100 with side flanges 101 and 102 is rotatable on fixed shaft 103 supported at one end by a standard 104 and at the other by a disc 106 in fixed drum 107 projecting coaxially with drum 100 from standard 108. Drum 107 is of the same diameter as drum 100. A continuous linear conductor 110, i.e., a cable, or hose, a flexible optical transmitter, etc., is wound on drum 100, paying out from the right-hand end thereof, and being clamped to the drum at a point a number of turns leftward of said right-hand end, as indicated at 112. Inside clamp or clamping point 112, the conductor is shown as making, in the position shown, one further turn around drum 100, then forming a bight 113 around pulley 114, and then being wrapped, in the opposite direction away from a viewer looking toward the left in FIG. 8, about stationary drum 107. The fixed stationary end of the conductor is designated at 115. The pulley is on a carriage, designated by numeral 120, understood to be in general like the pulley carriage of the embodiment of FIGS. 1—7. The gear drive, however, differs. The carriage 120 includes a planetary gear cage, the inner ring 122 of which is rotatable on a hub 123 projecting from disc 106, and the outer ring 124 of which is affixed to or a part of the carriage 120. The cage 122, 124 carries planetary bevel pinions 125, which mesh on one side with a rotating bevel gear 126 mounted on drum flange 102, and on the opposite side with a fixed bevel gear 127 mounted on fixed disc 106. Clearly, rotation of the drum 100 operates through the bevel gear differential just described to cause the pulley carriage 120 to planetate or orbit at half the frequency, or rate, of rotation of the drum 100. The embodiment of FIG. 8 is completed by a slide way 130 on pulley carriage 120, projecting from the pulley axle 132. The drum 100 can be rotated by a motor and stepdown gearing but is here shown for simplicity as rotated by a hand crank 140 carrying a pinion 141 meshing with an internal gear 142 formed in drum flange 101. Clearly, the portion of the conductor to the left of the clamp 112 is transported between the corresponding portion of the drum 100 and the nonrotatable drum 107 as the drum 100 is rotated, again without twisting the extremity of the conductor.

Figures 9, 10:
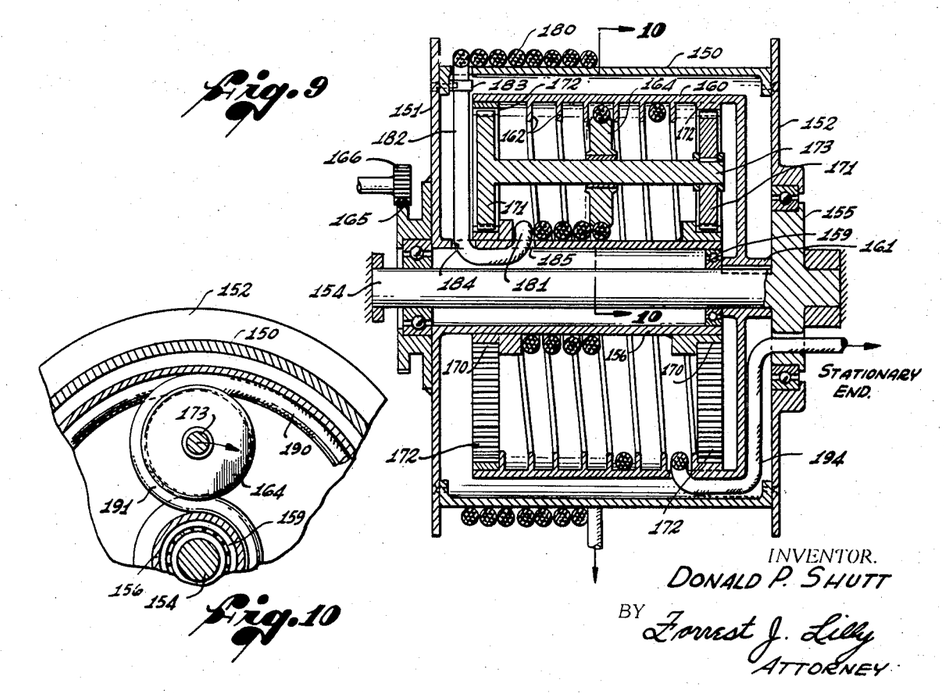
FIG. 9 is a longitudinal sectional view, this time of a second alternative embodiment of the invention.
FIG. 10 is a section taken on line 10–10 of FIG. 9.

FIGS. 9 and 10 show, largely diagrammatically, a further embodiment, the main winding drum being indicated at 150, with side flanges 151 and 152 rotatably mounted, respectively, through suitable bearings on drum shaft 154, and on a disc 155 on drum shaft 154. The drum shaft is stationarily mounted, as indicated. Projecting coaxially inwardly from drum flange 151 is an inner rotatable auxiliary drum 156, whose projecting end is supported by a bearing at 159. A stationary drum 160, somewhat smaller in diameter than main drum 150, is mounted coaxially inside the latter, and has a flange 161 at one end fixedly mounted on the drum shaft.

Helical ribs 162 are provided inside the drum 160 to guide the cable, and also the later more fully described pulley or sheave 164.

The drum can be driven by a motor and reduction gear set, and as here shown, the flange 151 carries a gear 165 driven by the output pinion 166 of any suitable power input.

On the ends of inner rotatable drum 156 are a pair of sun gears 170, with which mesh a pair of planet or orbit gears 171, which in turn mesh with a pair of stationary internal ring gears 172 mounted inside the stationary drum 160. The gears 171 are connected by an axle 173, on which is rotatably mounted the hub of the aforementioned sheave 164. In the preferred organization, here indicated, the gears 170 and 171 are of the same pitch diameter, and the pitch diameter of the gears 172 is three times that of each of the other two. Other ratios could of course be used. With the ratios given, however, rotation of main drum 150 causes rotation of inside drum at one to one ratio, and orbital travel of gears 171, together with sheave 164, at one-fourth the angular velocity of the drums 150 and 156.

The conductor 180 is wound on the main drum 150 as before, clockwise and away from the viewer, as viewed from the left in FIG. 9. The drum-end position 182 of the conductor extends radially inwardly through the drum cylinder. It may be clamped to the rotary drum structure, as at 183. The inwardly extending conductor portion 181 is led from the cylinder of drum 150 inwardly through an aperture 184 in drum 156, and then outwardly through another aperture 185, beyond which it is wound on the drum 156, the wind here being clockwise toward the viewer as seen from the left in FIG. 9. From drum 156, the conductor portion 181 is led, in a loop 190, forming a bight 191, around sheave 164, which guides it onto the inside cylindric surface of stationary drum 160, where it is received between helical ribs 162 directing it to wind on clockwise, away from the viewer as viewed in FIG. 10, or from the left in FIG. 9. The stationary extremity 194 of the cable portion 181 is led outside stationary drum 160, and through the stationary drum mounting disc 155 to an external coupling. The extremity 194 may be stationarily fixed by means of any suitable clamp, not shown; but it will be evident that its threading through the cylinder of the drum 161 and through disc or wall 155 constitutes such members as stationary fixing means for the cable extremity.

It will be clear that the embodiment of FIGS. 9 and 10 is equivalent broadly to those heretofore described. It will be seen that the inside rotating drum will take one-fourth the number of wraps as the main outside drum when the auxiliary conductor length is fully wrapped thereon. It will also be seen that the stationary drum, being three times the pitch diameter of the inside rotating drum, requires only one-fourth the wraps that would be required, if these drums were the same diameter. The sheave 164, orbiting at one-fourth the angular velocity of the rotating inside drum, lays conductor on the inside drum, or unwinds it therefrom, at the same linear rate as it goes on and/or is removed from the rotating inside drum. It will be noted that the sheave 164 is translated longitudinally along the axle 173, guided properly by the helical ribs 162, to assure level winding. The system thus transfers conductor from the stationary drum to the inside rotatable drum while the main drum 150 is paying out conductor, and vice versa, without twisting of the auxiliary cable.

The embodiment of FIGS. 9 and 10 suggests and is partially illustrative of their embodiments. For example, the roles of the rotatable inside drum 156 and stationary drum 160 can be interchanged, the drum 160 being fixed with the main outside drum, and the cable being immediately wound therein, and then led to the then stationary drum 156 via a sheave such as 164. Moreover, by a further simple modification, the inside stationary drum can then be the inside surface of the main outside drum.

It will, of course, be understood that the present drawings and description are of certain present embodiments only, which are disclosed herein merely for illustrative purposes, and that various changes in design, structure, and arrangement may be made without departing from the spirit and scope of the invention or of the appended claims.

I claim:

1. A winding drum mechanism for a continuous linear conductor comprising the combination of:
   a main rotatable winding drum for said conductor;
   an auxiliary rotatable winding drum coaxial with and connected for rotation with and in the same direction as said main winding drum;
   a nonrotatable winding drum coaxial with said auxiliary rotatable winding drum;
   said conductor being fixed to said main drum at a point near but spaced from its drum and extremity, and being fixed at said extremity against twist, the portion of said conductor beyond said point being reeled on said main drum for payout therefrom, and the portion of said conductor between said point and said extremity forming a loop having a bight, with the portions of said loop on opposite sides of said bight wound, one on the auxiliary rotatable drum from said bight toward said point, and the other on said nonrotatable drum from said bight toward said fixed extremity, the direction of wind of said portions being the same away from said bight, and the wind of said conductor continuing in the same direction from said rotatable auxiliary drum onto said main winding drum;
   a pulley engaged in said bight;
   means for orbitally transporting said pulley around the axis of said auxiliary rotatable drum and said nonrotatable drum at an angular velocity to wind conductor between said nonrotatable drum and said auxiliary rotatable drum as the main winding drum is rotated;
   said means for transporting said pulley including a pulley carriage orbital about the axis of said drum; and
   means mounting said pulley on said carriage for travel longitudinally of said auxiliary and nonrotatable drums.

2. The subject matter of claim 1, wherein one of said drums comprises an inside cylindric drum surface of one of said drums.

3. The subject matter of claim 1, wherein said nonrotatable drum is annularly spaced inside said main drum and outside said auxiliary rotatable drum.

4. A winding drum mechanism for a continuous linear conductor comprising the combination of:
   a main rotatable winding drum for said conductor;
   an auxiliary rotatable winding drum coaxial with and connected for rotation with and in the same direction as said main winding drum;
   a nonrotatable winding drum coaxial with said auxiliary rotatable winding drum;
   said conductor being fixed to said main drum at a point near but spaced from its drum end extremity, and being fixed at said extremity against twist, the portion of said conductor beyond said point being reeled on said main drum for payout therefrom, and the portion of said conductor between said point and said extremity forming a loop having a bight, with the portions of said loop on opposite sides of said bight wound, one on the auxiliary rotatable drum from said bight toward said point, and the other on said nonrotatable drum from said bight toward said fixed extremity, the direction of wind of said portions being the same away from said bight, and the wind of said conductor continuing in the same direction from said rotatable auxiliary drum onto said main winding drum;

a pulley engaged in said bight; and means for orbitally transporting said pulley around the axis of said auxiliary rotatable drum and said nonrotatable drum at an angular velocity to wind conductor between said nonrotatable drum and said auxiliary rotatable drum as the main winding drum is rotated, said means for transporting said pulley including:

a pulley carriage orbital about the axis of said drums;

gear means orbital about said axis; and means including a spring interconnecting said orbital gear means and said pulley carriage so as to exert a force on said carriage tautening the conductor forming said bight around said pulley.

5. A winding drum mechanism for a continuous linear conductor comprising the combination of:

a main rotatable winding drum for said conductor;

an auxiliary rotatable winding drum coaxial with and connected for rotation with and in the same direction as said main winding drum;

a nonrotatable winding drum coaxial with said auxiliary rotatable winding drum, said nonrotatable drum being annularly spaced radially inside said main drum and outside said auxiliary drum;

said conductor being fixed to said main drum at a point near but spaced from its drum end extremity, and being fixed at said extremity against twist, the portion of said conductor beyond said point being reeled on said main drum for payout therefrom, and the portion of said conductor between said point and said extremity forming a loop having a bight, with the portions of said loop on opposite sides of said bight wound, one on the auxiliary rotatable drum from said bight toward said point, and the other on said nonrotatable drum from said bight toward said fixed extremity, the direction of wind of said portions being the same away from said bight, and the wind of said conductor continuing in the same direction from said rotatable auxiliary drum onto said main winding drum;

a pulley engaged in said bight;

means for orbitally transporting said pulley around the axis of said auxiliary rotatable drum and said nonrotatable drum at an angular velocity to wind conductor between said nonrotatable drum and said auxiliary rotatable drum as the main winding drum is rotated, said means comprising a planetary gear set including a stationary gear fixed relative to said nonrotatable a rotating gear turning with said auxiliary rotatable drum, and an orbit gear entrained therebetween and connected to said pulley;

said stationary gear comprising an internal gear fixed coaxially to said nonrotatable drum;

said rotating gear comprising a spur gear on said rotatable drum;

said orbit gear meshing with said spur gear and said internal gear;

a mounting means for said orbit gear journaling it at the axis thereof; and a carrier for said pulley connected with said mounting means for said orbit gear and affording freedom for translation of said pulley parallel with the drum axis.

UNITED STATES PATENT OFFICE
CERTIFICATE OF CORRECTION

Patent No. 3,539,123      Dated November 10, 1970

Inventor(s)    Donald P. Shutt

It is certified that error appears in the above-identified patent and that said Letters Patent are hereby corrected as shown below:

On the cover sheet [73], "Western Electric Corporation" should read -- Western Gear Corporation --.

Signed and sealed this 4th day of May 1971.

(SEAL)
Attest:

EDWARD M. FLETCHER, JR.          WILLIAM E. SCHUYLER,
Attesting Officer                 Commissioner of Paten